United States Patent
Otugen et al.

(10) Patent No.: US 7,701,586 B2
(45) Date of Patent: Apr. 20, 2010

(54) MICRO-OPTICAL WALL SHEAR STRESS SENSOR

(75) Inventors: Volkan Otugen, Dallas, TX (US); Valery Sheverev, West Orange, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 337 days.

(21) Appl. No.: 11/926,793

(22) Filed: Oct. 29, 2007

(65) Prior Publication Data

US 2008/0158542 A1 Jul. 3, 2008

Related U.S. Application Data

(60) Provisional application No. 60/877,391, filed on Dec. 27, 2006.

(51) Int. Cl.
*G01B 9/02* (2006.01)

(52) U.S. Cl. .................. 356/480; 356/35.5; 356/481

(58) Field of Classification Search ............... 356/482, 356/481, 520, 517, 35.5
See application file for complete search history.

(56) References Cited

U.S. PATENT DOCUMENTS

| 6,901,101 | B2* | 5/2005 | Frick | 372/92 |
| 7,212,701 | B2* | 5/2007 | Strecker | 385/14 |
| 2003/0174923 | A1* | 9/2003 | Arnold et al. | 385/12 |
| 2004/0233458 | A1* | 11/2004 | Frick | 356/480 |

* cited by examiner

*Primary Examiner*—Tarifur Chowdhury
*Assistant Examiner*—Jonathan M Hansen
(74) *Attorney, Agent, or Firm*—Straub & Pokotylo; John C. Pokotylo

(57) ABSTRACT

Stresses and strains on a solid surface subject to a fluid flow are dynamically measured based on a shift of optical resonances of a micro-resonator. The elastic deformation and refractive index change of a micro-resonator due to mechanical stress is exploited. With this approach, mechanical deformations in the order of a nanometer can be detected and related to shear stress.

25 Claims, 9 Drawing Sheets

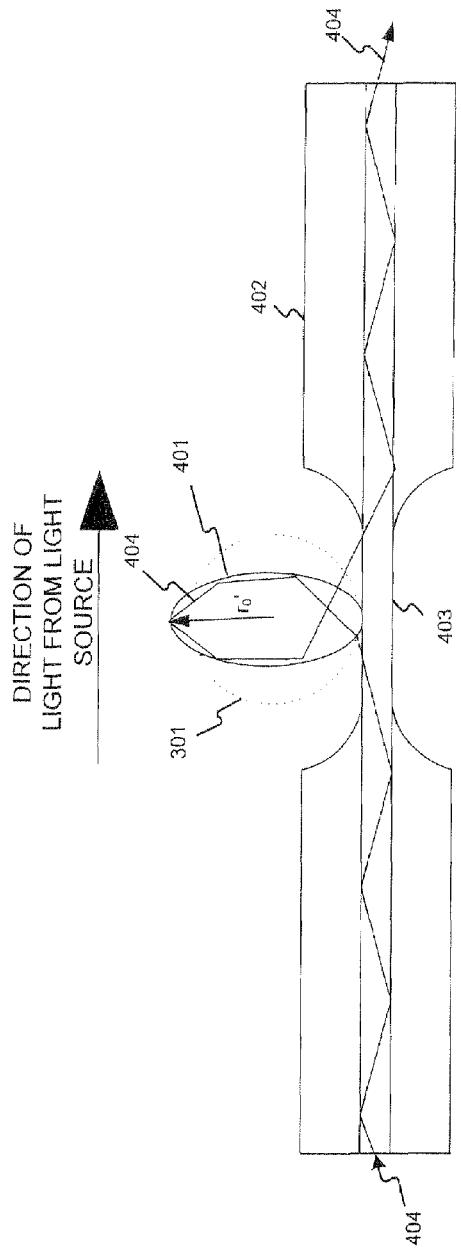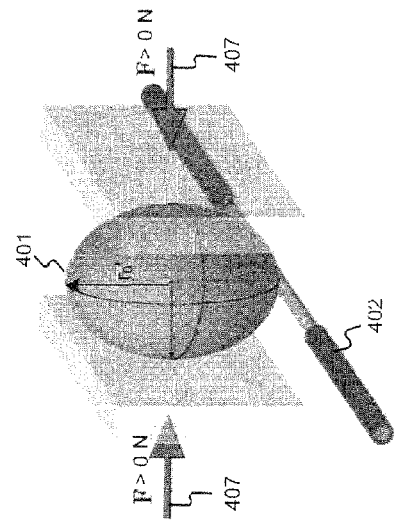
FIGURE 4A
FIGURE 4B

MICRO-OPTICAL WALL SHEAR STRESS SENSOR

§0. RELATED APPLICATIONS

Benefit is claimed, under 35 U.S.C. §119(e) (1), to the filing date of U.S. provisional patent application Ser. No. 60/877,391 (referred to as "the '391 provisional"), titled "MICRO-OPTICAL WALL SHEAR STRESS SENSOR", filed on Dec. 27, 2006, and listing Volkan Otugen and Valery Sheverev as the inventors, for any inventions disclosed in the manner provided by 35 U.S.C. §112, ¶1. The '391 provisional application is expressly incorporated herein by reference. The scope of the present invention is not limited to any requirements of the specific embodiments described in the '391 provisional application.

§1. BACKGROUND OF THE INVENTION

§1.1 Field of the Invention

The present invention concerns the measurement of wall shear stress (or skin friction) in a fluid flow. More specifically, the present invention concerns an optical micro-sensor which can measure wall shear stress (or skin friction) due to a flowing fluid over a solid surface with very high sensitivity and dynamic range.

§1.2 Related Art

§1.2.1 Shear Stress Measurement in Fluid Flow

The accurate measurement of wall shear stress remains a challenge in fluid mechanics. The dynamic measurement of the local wall shear stress is important not only from the standpoint of basic fluid mechanics research including high-speed and unsteady aerodynamics, but also from the perspective of dynamic flow control. Despite the long history of wall shear force measurement attempts using both direct and indirect approaches, the state of the art is still insufficient to meet all needs.

Most of the available sensors use indirect measurement techniques where the wall shear stress is inferred, through a set of assumptions, from another flow property (such as, for example, streamwise velocity or heat transfer rate) measured at or near the wall. Indirect measurement methods include hot-wire/film-based anemometry or heat flux gages surface acoustic wave sensors and laser-based velocity measurements using the Doppler Effect. However, such indirect measurement techniques lack the precision required in some applications due to the assumptions, extrapolations, and calculations used to relate the changes in flow properties to the measurement of shear stress. In addition, inferred stress measurement methods based on changes in temperature may require calibration in order to account for, and remove the effects of, the many external environmental variables which effect temperature.

Another measurement method that has been frequently used is surface oil film interferometry. Unfortunately, this approach does not provide dynamic measurement of the wall shear stress and the spatial resolution can be poor.

One of the few direct wall shear measurement techniques available is the floating element method. Using this method, the bending of a free floating, long stemmed element due to the wall shear force is measured and related to the shear stress. Recently, miniaturized sensors of this type have been produced using the available micro-electro-mechanical system ("MEMS") technology. However, floating element sensors are essentially mechanical devices that employ moving components subjected to considerable deflections, such as a suspended plate attached to a stem that is inside an opening in the wall. This leads to certain drawbacks that include vulnerability to vibration, time response limitations, undesirable flows through gaps, and pressure and temperature gradient effects.

Another type of direct wall shear stress measurement method uses fiber-based Fabry-Perot interferometers or Fiber-Bragg gratings. These methods rely on the deflection of an optical beam to convert any change in a mechanical attribute of a structure (for example, a tip displacement) into the resonance frequency shift. This requires a precise alignment of a laser beam at the micro-fabricated mechanical system, and the use of an external photo detector array for detecting the motion of the mechanical structure. Further, the amount of deflection and/or deformation required for the measurement is too large for some applications. Thus, methods that provide a considerably finer measurement resolution than any of the other methods in this class including frequency selective fiber-based Fabry-Perot interferometers and Fiber-Bragg gratings would be useful.

In view of the foregoing, improved wall shear stress measurement techniques, and apparatus for effecting such techniques, would be useful.

§2. SUMMARY OF THE INVENTION

Embodiments consistent with the present invention provide dynamic measurement of stresses and strains on a solid surface subject to a fluid flow based on a shift of optical resonances of a micro-resonator. The elastic deformation and refractive index change of a micro-resonator due to mechanical stress is exploited. With this approach, mechanical deformations in the order of a nanometer can be detected and related to shear stress.

Some embodiments consistent with the present invention may provide a shear stress sensor which includes (1) a base component, (2) a sensing component including a sensing surface, (3) a micro-resonator arranged between the base component and the sensing component, and (4) an optical carrier optically coupled with the micro-resonator, such that the sensing component can move with respect to the base component responsive to the fluid flow across the sensing surface, such that the micro-resonator undergoes a change in shape and refractive index.

The present invention may also provide a detection and/or measurement technique by (a) providing, in a fluid flow, a shear stress sensor, (b) coupling light from a light source into a first end of an optical carrier of the shear stress sensor, (c) detecting a property of the light using a detector coupled to a second end of the optical carrier of the shear stress sensor, and (d) determining the shear stress based on the detected property of the light, such that the detected property of light is based on a shift in resonance of the micro-resonator caused by the change in shape and refractive index of the micro-resonator.

§3. BRIEF DESCRIPTION OF THE DRAWINGS

FIGS. 4A and 4B are cross-sectional and three-dimensional views, respectively, of a micro-resonator coupled onto a cylindrically eroded fiber, along with the internal reflections in a micro-resonator, where the axial force applied to the micro-resonator due to a fluid flow is a second value.

§4. DETAILED DESCRIPTION

Figure 1:
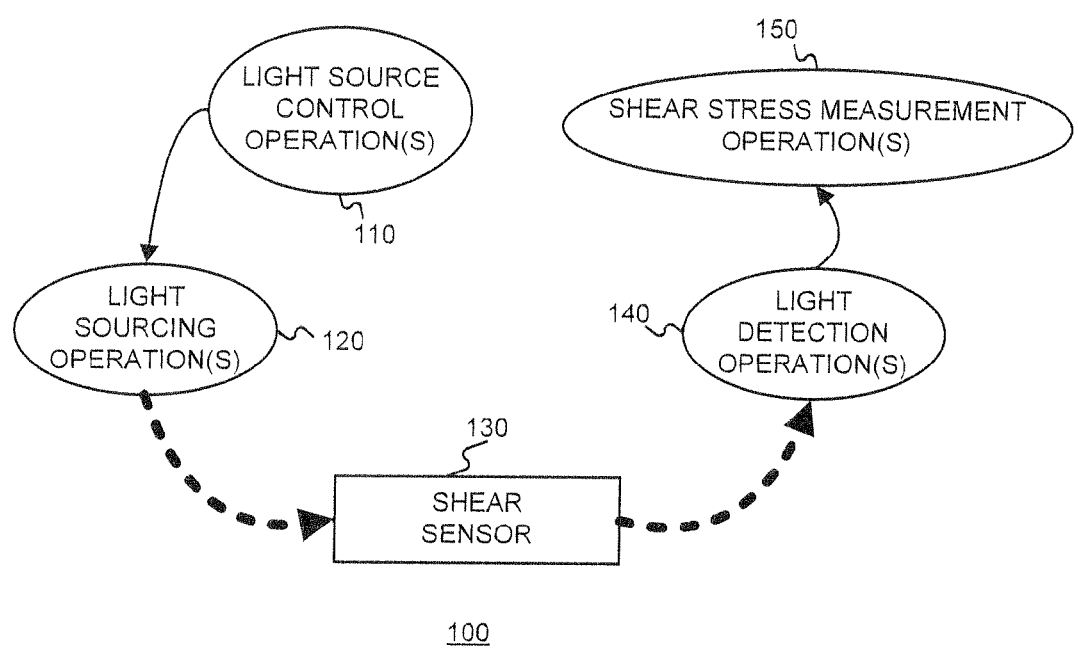
FIG. 1 illustrates operations that may be performed by a system for detecting and/or measuring shear stress based on a shift of optical resonances of a micro-resonator.

The following detailed description is presented to enable one skilled in the art to make and use the invention, and is provided in the context of particular embodiments and methods. Various modifications to the disclosed embodiments and methods will be apparent to those skilled in the art, and the general principles set forth below may be applied to other embodiments, methods and applications. Thus, the present invention is not intended to be limited to the embodiments and methods shown and the inventors regard their invention as the following disclosed methods, apparatus and materials and any other patentable subject matter to the extent that they are patentable.

No element, act or instruction used in the description should be construed as critical or essential to the invention unless explicitly described as such. Also, as used herein, the article "a" is intended to include one or more items. Where only one item is intended, the term "one" or similar language is used.

§4.1 Measurement Principle Using Ray Optics in Micro-Resonators having a Changing Shape Recent developments in optical fiber and switching technologies have been exploited to provide highly sensitive measurements based on "whispering gallery modes" (WGM) shifts of dielectric micro-resonators. It is based on the interaction between the material deformation and the optical field of the sensing element (optical resonator). The sensing element, a micro-resonator, is coupled to an optical fiber. The micro-resonators are typically micro-beads or micro-spheres, although other geometries such as micro-disks and geometries having elliptical cross-sections can also be used. The optical fiber, which carries light from a tunable laser, serves as an input/output port for the micro-resonator. When the micro-resonator is sufficiently close to an exposed section of the fiber core (either by etching it or by heating and stretching), its resonances are observed as sharp dips in the transmission spectrum. These optical resonances, also known as the "whispering gallery modes" (WGM), are extremely narrow and hence are highly sensitive to any change in the shape and size if the micro-resonator. A minute change in the shape, size, or refractive index of the micro-resonator will cause a shift in the resonance positions allowing for the precise measurement of the force causing the deformation. U.S. patent application Ser. No. 10/096,333, filed Mar. 12, 2002, titled "DETECTING AND/OR MEASURING A SUBSTANCE BASED ON A RESONANCE SHIFT OF PHOTONS ORBITING WITHIN A MICROSPHERE", and listing Stephen Arnold and Iwao Teraoka as the inventors (referred to as "the '333 application") describes such micro-resonator sensors. That application is incorporated herein by reference.

A novel wall shear stress sensor is described as an optical micro-sensor. This optical micro-sensor can measure wall shear stress (or skin friction) due to a flowing fluid over a solid surface with very high sensitivity and dynamic range. The measurement principle is based on the optical mode shifts of dielectric micro-resonators. Light from a scanning laser is coupled into one end of an optical fiber and its transmission spectrum is monitored by a photo-detector on the other end. The dielectric micro-resonator is brought sufficiently close to a bare section of the fiber allowing for the monitoring of the optical modes of the micro-resonator which is part of the sensor. With embodiments consistent with the present invention, very small amounts of wall shear stress, and their direction, can be measured by monitoring the optical mode shifts of the micro-resonator.

§4.2 Exemplary Applications

The present invention involves novel methods and apparatus capable of dynamically measuring stresses and strains on a solid surface subject to a fluid flow based on a shift of optical resonances of a micro-resonator. The disclosed sensors exploit elastic deformation and refraction index change of a micro-resonator due to mechanical stress. With this approach, mechanical deformations in the order of a nanometer can be detected and related to shear stress. Hence, these methods and apparatus offer significant advantages over the currently available methods in measurement sensitivity and reliability, as well as sensor ruggedness. Due to the optical attributes, the sensors can be built with much smaller sensing element sizes than what is possible with the currently available methods. Thus, the compact and robust wall shear stress micro-sensors can be incorporated into optical sensor arrays for distributed wall shear stress measurements.

Embodiments consistent with the present invention may have many applications. For example, some embodiments may be used as a new tool for fluid dynamics research. Other embodiments may be used on aircraft (for vehicle drag reduction) and a wide range of industries that require process control. For example, the control of fluid flow is a very important problem in areas such as aircraft flight, fuel-air mixing, flow of gas or oil in a pipeline, and liquid metal or polymers in mold during manufacturing of parts, and embodiments consistent with the present invention may be advantageously employed in these areas. The fluid flow control problem is important in medical and bio-medical fields also, which include drug delivery, clinical testing and maintaining a specific environment for cell or tissue storage, and embodiments consistent with the present invention may be advantageously employed in these areas as well.

§4.3 Exemplary Operations

FIG. 1 is a bubble chart illustrating operations that may be performed by an exemplary system for measuring the shear stress of a solid surface subject to a fluid flow in a manner consistent with the present invention. A light sourcing operation 120 may emit a light, under the control of a light source control operation 110, into (or through) a shear sensor 130. A detection operation 140 may detect light from the shear sensor 130. Certain detected properties of the light may then be provided to detection and/or measurement operation(s) 150. Exemplary methods and apparatus that may be used to effect these various operations are described in §4.4 below.

§4.4 Exemplary Methods and Apparatus for Performing the Exemplary Operations Exemplary apparatus that may be used to dynamically measure stresses and strains on a solid surface subject to a fluid flow are described in §4.4.1 below. Then, exemplary methods that may be used to perform operations related to dynamically measuring stresses and strains on a solid surface subject to a fluid flow are described in §4.4.2 below.

§4.4.1 Exemplary Apparatus for Measuring Shear Stress

Figure 2:
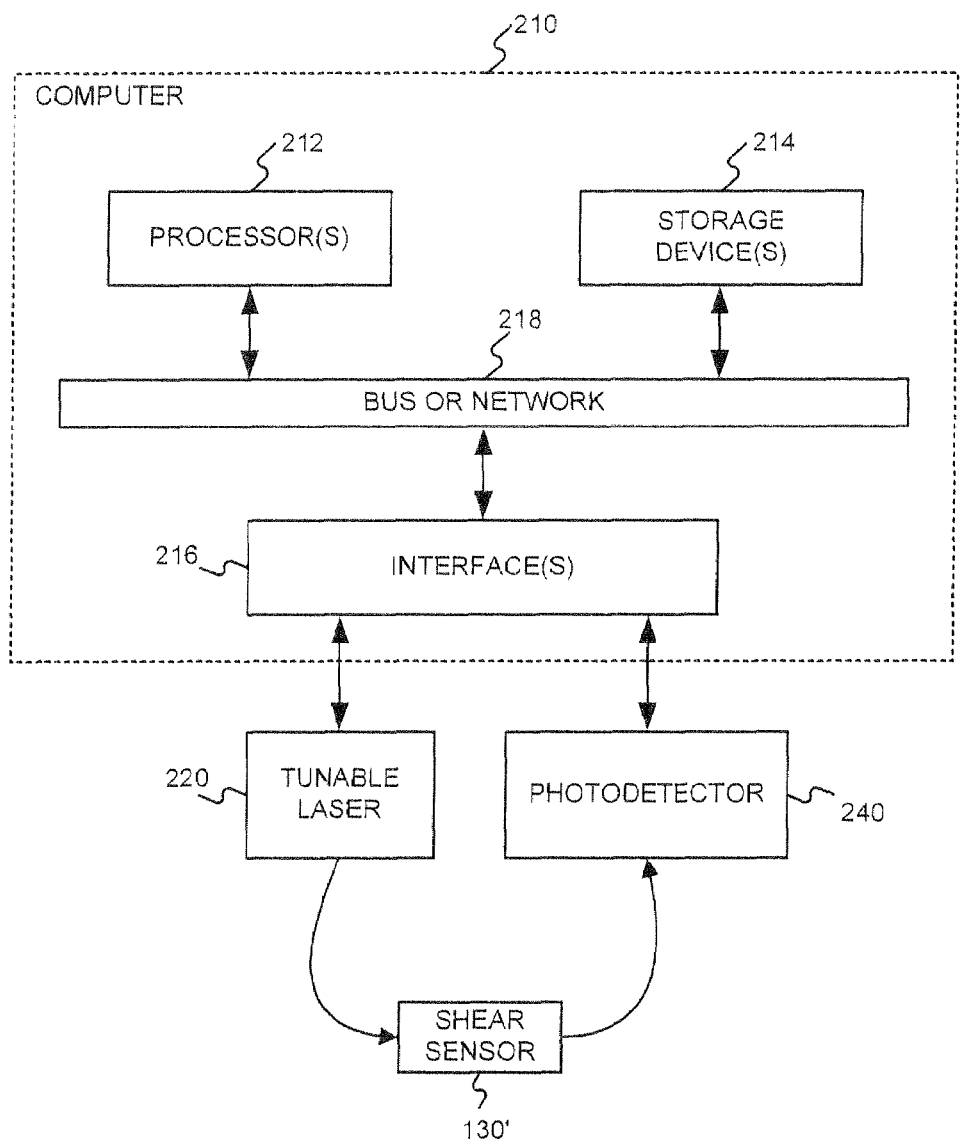
FIG. 2 illustrates an exemplary system for measuring shear stress based on a shift of optical resonances of a micro-resonator.

FIG. 2 is a block diagram of a system 200 that may be used to perform the operations of FIG. 1. A light source, such as a tunable laser 220, and/or a light detector 240 may be controlled by one or more control means. Control means may include a general purpose processor executing stored program instructions. Control means may be a computer 210 including one or more processors 212, one or more storage devices 214, one or more input interfaces 216, one or more output interfaces 216, communications means such as a bus and/or network 218, etc. Data representative of detected light may be stored, perhaps with associated information.

Furthermore the means for determining a shear stress based on a property of the detected light, where the property is based on a shift in resonance of the micro-resonator caused by the change in shape of the micro-resonator, can be performed by the computer 210 in FIG. 2.

§4.4.1.1 Exemplary Light Source

As can be appreciated from the foregoing, the tunable laser 220 may perform the light sourcing operation(s) 120. The '333 application, incorporated by reference above, describes such exemplary tunable lasers.

§4.4.1.2 Exemplary Detector

As can also be appreciated from the foregoing, the detector 240 may perform the light detecting operation(s) 140. The '333 application, incorporated by reference above, describes exemplary detectors.

§4.4.1.3 Exemplary Shear Stress Sensor

The following section describes exemplary shear stress sensors consistent with the present invention. Exemplary micro-resonator components of such sensors are first described in §4.4.1.3.1. Then, the entire sensor, including the relation of the components with respect to each other, is described §4.4.1.3.2.

§4.4.1.3.1 Exemplary Micro-Resonator

Figure 3A:
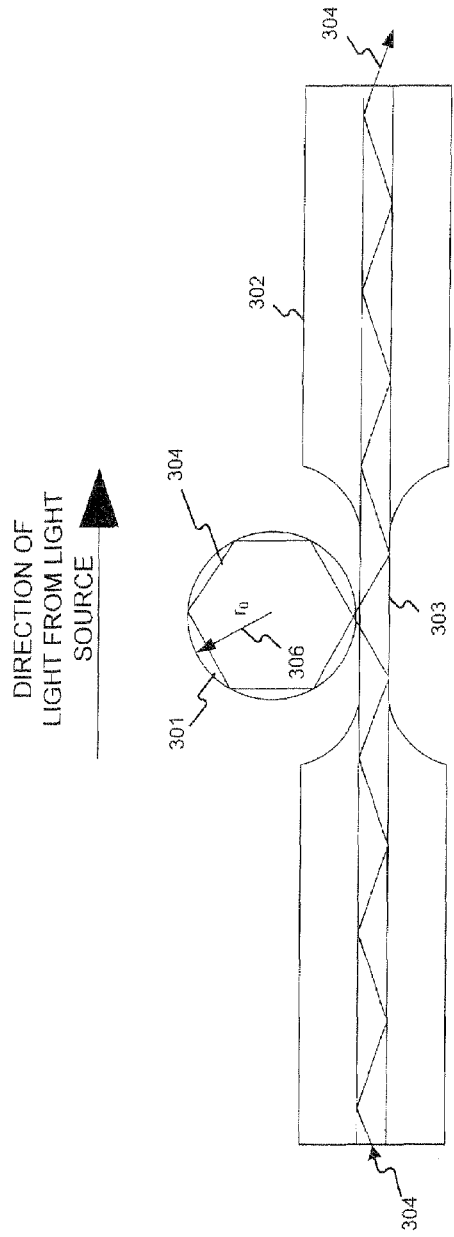
FIGS. 3A and 3B are cross-sectional and three-dimensional views, respectively, of a micro-resonator coupled onto a cylindrically eroded or stretched fiber, along with the internal reflections in a micro-resonator, where the axial force applied to the micro-resonator due to a fluid flow is a first value (e.g., zero).
Figure 3B:
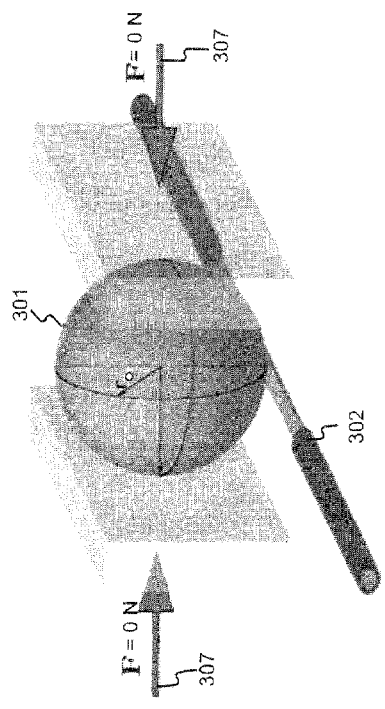

FIGS. 3A and 3B are cross-sectional and three-dimensional views, respectively, of a micro-resonator 301 coupled onto a cylindrically eroded or stretched fiber 302 along with the internal reflections 304 in a micro-resonator where an axial force 307 is not applied to the micro-resonator. The micro-resonators are typically micro-beads or micro-spheres, although other geometries such as micro-disks and geometries having elliptical cross-sections can also be used. Light with vacuum wavelength $\lambda$ can be introduced into a dielectric micro-resonator 301 of radius $r_o$ 306 and refractive index n, for example, by side-coupling it to a tapered optical fiber 302, as shown in FIG. 3A. The radius 306 of the micro-resonator(s) 301 preferably ranges from about 2 μm to about 1 mm, and more preferably is from about 10 μm to about 100 μm.

Figure 5:
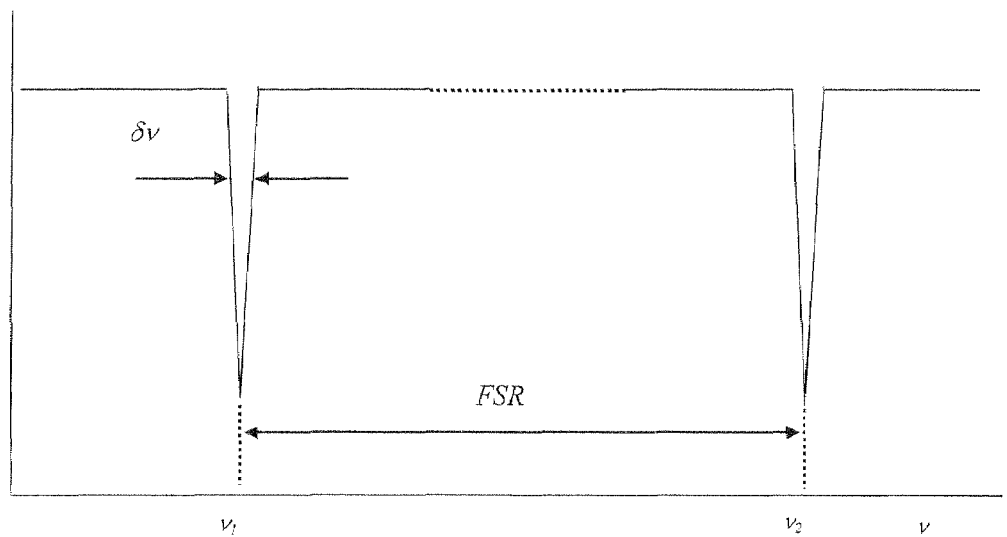
FIG. 5 illustrates a shift of optical resonances of a micro-resonator as the shape of the micro-resonator changes.

The WGMs in a micro-resonator are associated with optical paths 304 such as the one shown in FIG. 3A. Light travels inside the interior surface of the micro-resonator through total internal reflection and returns in phase. The condition for optical resonance (or WGM) is $2\pi r_o n = l\lambda$ where l is an integer and a measure of the ratio of the roundtrip path to the wavelength. In terms of frequency, v, this condition is $v=(c/2\pi r_o n)l$ where, c is the speed of light in vacuum. An incremental change in index of refraction or radius of the micro-resonator will result in a shift in the resonant frequency; $\Delta n/n \sim \Delta v/v$, or $\Delta r/r \sim \Delta v/v$. Therefore, a change in the shape of the micro-resonator that induces a $\Delta n$ or $\Delta r$ of the micro-resonator, as shown in FIGS. 4A and 4B, can be sensed by monitoring the WGM shifts. FIGS. 4A and 4B are cross-sectional and three-dimensional views, respectively, of the micro-resonator 401 where an axial force 407 is applied to the micro-resonator. The WGMs are observed as sharp dips in the transmission spectrum through the fiber as depicted schematically in FIG. 5. The observed line-width, $\delta v$, is related to the quality factor, $Q = v/\delta v$. The smaller the energy loss as the light circulates inside the micro-resonator, the larger Q is, with $Q \to \infty$ as the losses vanish. For fused silica micro-resonators in optical configurations as shown in FIGS. 3A-4B, a Q value approaching material loss limit of $10^{10}$ can be achieved. The observed line-width $\delta v$ determines the measurement resolution.

Consider the configuration in FIGS. 4A and 4B as compared to that in FIGS. 3A and 3B where a micro-resonator 401 in FIGS. 4A and 4B is subjected to a uniaxial stress 407. The equatorial radius of the micro-resonator 401 becomes larger resulting in the WGM shift shown in FIG. 5. If we assume that the smallest measurable radius change is of the order of $\Delta r \sim 1$ nm, for a hollow, $r_o = 100$ μm silica bead with 10 μm wall thickness, an estimated force resolution of $\Delta F \sim 10^{-3} N$ is obtained. If a polyester bead is used, instead, the estimated resolution becomes $\Delta F \sim 10^{-5} N$. For a Poly(n-hexyl methacrylate) bead the estimated resolution further improves to $\Delta F \sim 10^{-7} N$. This highlights the sensitivity that can be achieved as a force sensor using this approach.

§4.4.1.3.2 Exemplary Sensor Configuration

Figure 6:
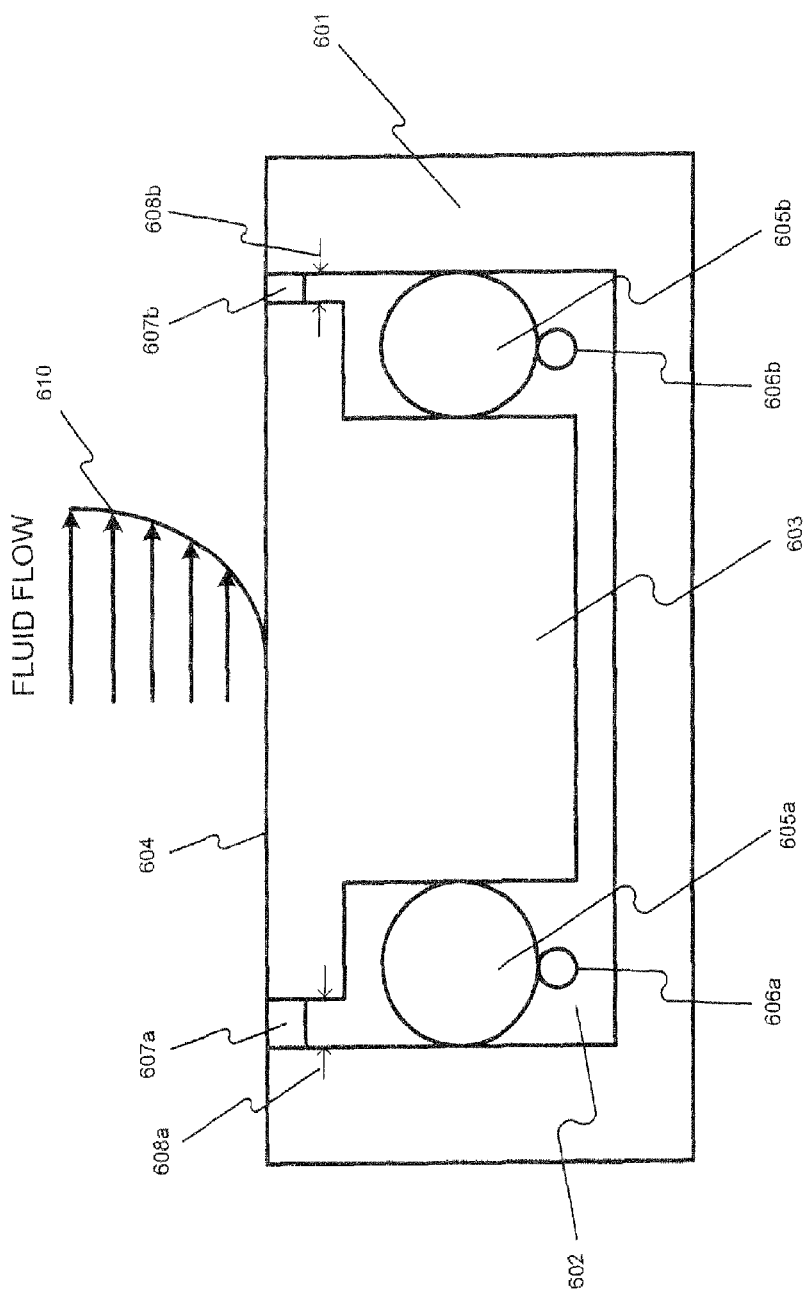
FIG. 6 is cross-sectional view of an exemplary shear stress sensor assembly, consistent with the present invention, which uses two micro-resonators.

An exemplary embodiment of a wall shear stress sensor 600 consistent with the present invention is shown schematically in FIG. 6. The sensor 600 includes a base component 601 which defines a cavity 602, a sensing component 603 with a sensing surface 604, two micro-resonators 605a, 605b, and single mode fibers 606a, 606b as shown. The sensing surface 604 may be flush with the flow and free to move along the stream direction 610. The micro-resonators may be side coupled to single mode fibers 606a, 606b as shown.

In FIG. 6, the optical resonators are shown as micro-beads or micro-spheres, although other geometries such as micro-disks and geometries having elliptical cross-sections can also be used.

The small gaps 608a, 608b at the upstream and downstream ends of the cavity between the base component 601 and sensing component 603 allow for the motion of the sensing surface 604. Sensors can be built with two types of gaps. In one embodiment, relatively large (~100 μm or greater) gap widths are used and the gaps are covered with compliant material (e.g., rubber) 607a, 607b so that the sensor surface is smooth and no cavity flow is induced. The relatively large gaps allow for the easy assembly of the sensor. However, for some practical applications where large temperature variations are possible, significant changes in the rubber characteristics may occur. To prevent this problem, an alternative design can be considered in which the gap between the base component cavity lip and the two ends of the sensing surface are significantly reduced (to about 1 μm) and left open. This approach is feasible since the deformation of the resonators will be in the range of nanometers.

The optical fibers 606a, 606b receive light from a single (or more) tunable diode laser on the input side. The WGMs of each micro-resonator are observed by a photodiode (PD) that is coupled at the output of each fiber.

In some embodiments consistent with the present invention, the sensing plate 603 is made of a high modulus of elasticity material such as a nickel alloy or titanium. A high modulus of elasticity material includes materials with a modulus of elasticity of at least 50 GPa.

The complete sensor 600 may be mounted flush to a test section wall. The orientation of the sensor determines the component of the shear stress to be measured. The use of two micro-resonators allows for the unambiguous determination of the wall shear direction.

Figure 7:
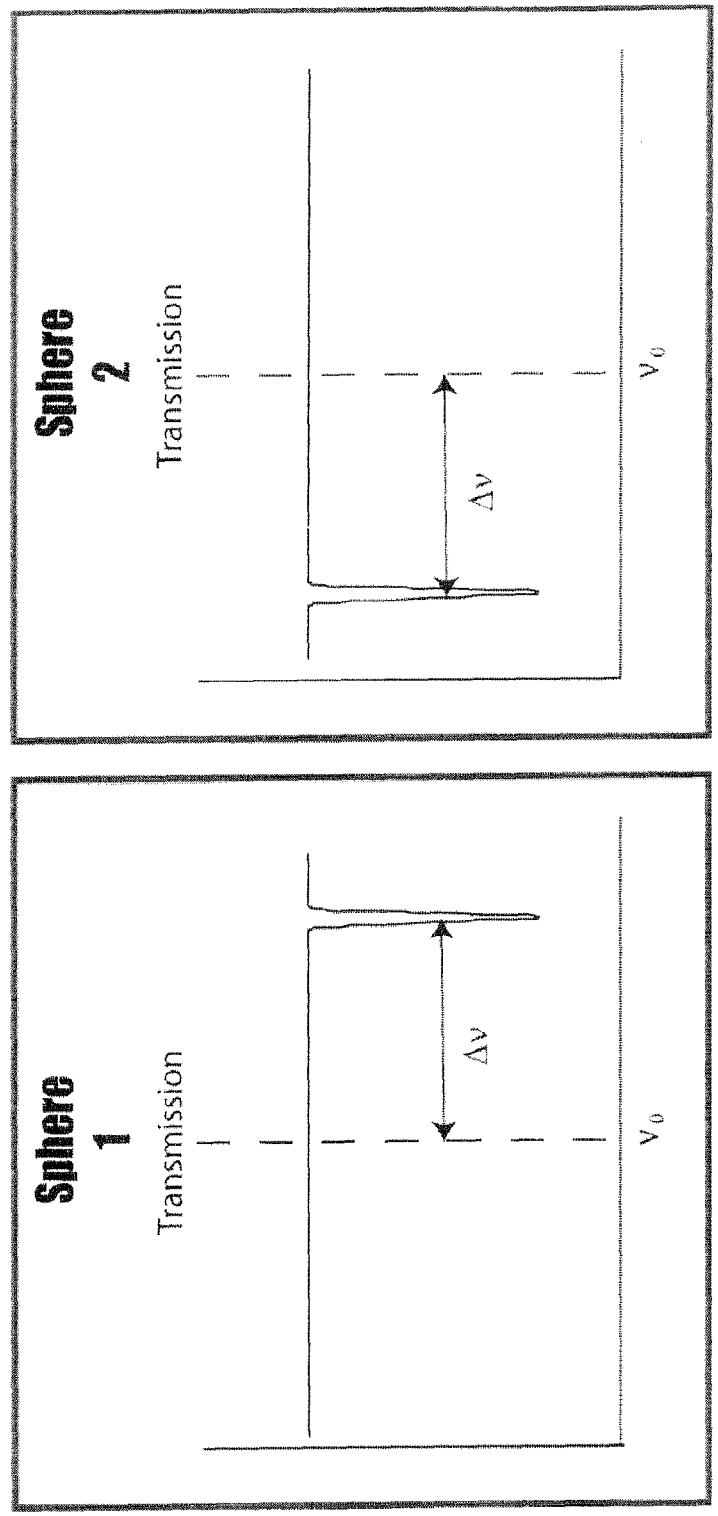
FIG. 7 illustrates a WGM shift of optical resonances of two micro-resonators of the sensor assembly shown in FIG. 6.

The micro-resonators 605a, 605b may be initially stress loaded (compressed). When the flow 610 is from left to right, a shear force is imposed on the sensing surface 604 of the sensing plate 603 which in turn causes a slight deformation of the two micro-resonators 605a and 605b. The equatorial radius of micro-resonator 605a becomes smaller while this radius of micro-resonator 605b becomes larger resulting in the WGM shift shown in FIG. 7. If the flow is from right to left, the opposite would be observed.

The mechanical stress on the micro-resonators 605a and 605b introduced by the surface force will also lead to a change in the index of refraction of the micro-resonator material in addition to the strain. Therefore, WGM shifts will be due to a perturbation both in the shape of the micro-resonator and the index of refraction along the optical path in the micro-resonator.

The magnitude of deformation is a function of micro-resonator 605a, 605b size and material as well as the surface area of the sensing surface 604 of the sensing plate 603. The choice of the sensing surface size, micro-resonator material, micro-resonator size, whether solid or hollow micro-resonators are to be used, etc., all depend on the type of flow and the required sensitivity. Several candidate micro-resonator dielectric materials include glass (silica), polystyrene and polyester elastomers, although other materials can also be used.

Figure 8:
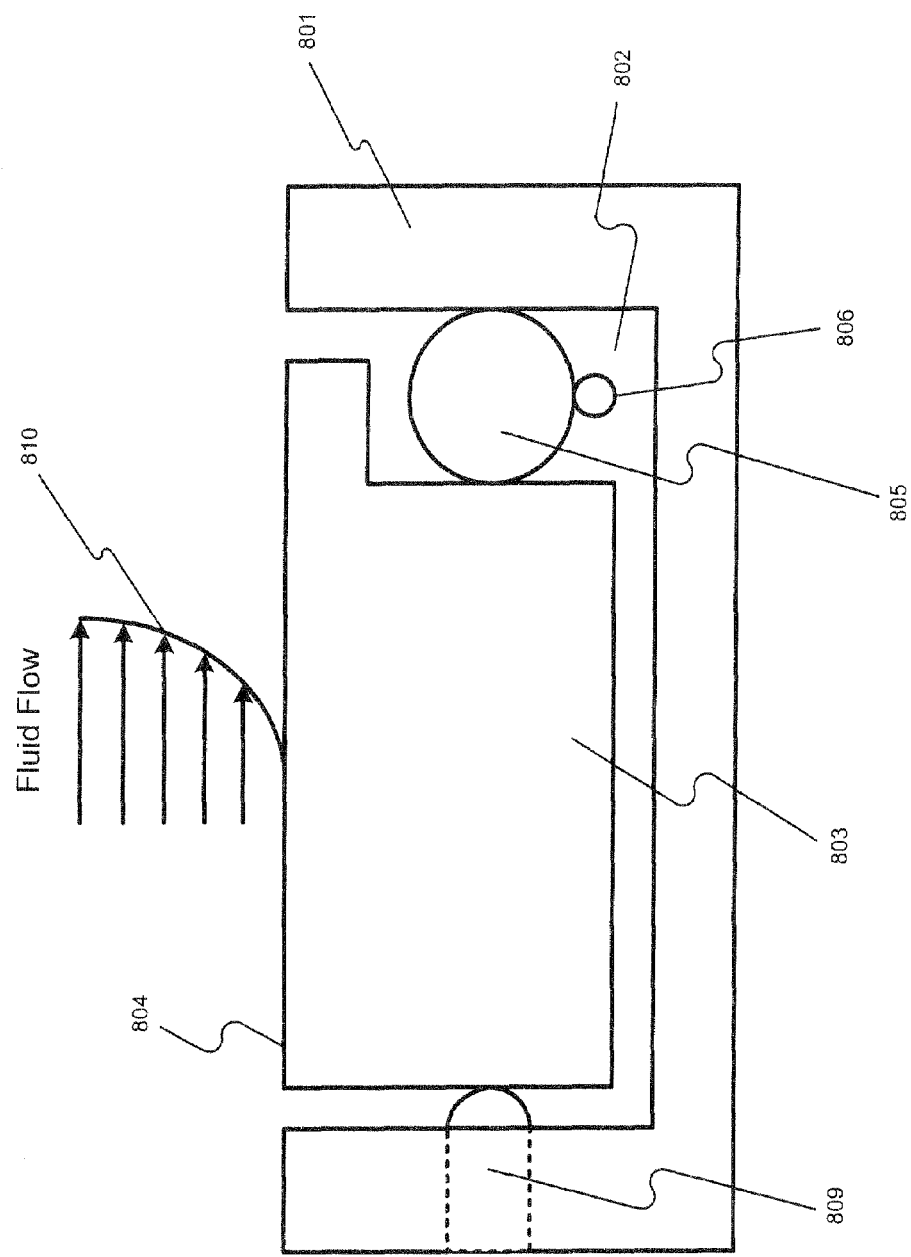
FIG. 8 is cross-sectional view of an exemplary shear stress sensor assembly, consistent with the present invention, which uses one micro-resonator along with a preload-component.

FIG. 8 shows an alternate sensor configuration 800 with a single micro-resonator 805 which would be simpler to manufacture.

The sensor 800 includes a base component 801 which defines a cavity 802, a sensing component 803 with a sensing surface 804, one micro-resonator 805, a single mode fiber 806, and a preload component 809 as shown. The sensing surface 804 may be flush with the flow and free to move along the stream direction 810. The micro-resonator may be side coupled to a single mode fiber 806 as shown.

The micro-resonator 805 may be initially stress loaded (compressed) via the pre-load component 809. When the flow 810 is from left to right, a shear force is imposed on the sensing surface 804 of the sensing plate 803 which causes further compression of the micro-resonator 805. The equatorial radius of micro-resonator 805 becomes smaller resulting in a WGM shift. If the flow is from right to left, a shear force is imposed on the sensing surface 804 of the sensing plate 803 which would cause a reduction in the amount of initial compression (i.e., the preload) of the micro-resonator 805. The equatorial radius of micro-resonator 805 becomes larger resulting in a WGM shift.

§4.4.2 Exemplary Methods for Measuring Shear Stress

An exemplary method for dynamically measuring stresses and strains on a solid surface subject to a fluid flow is described with reference to FIG. 9.

Figure 9:
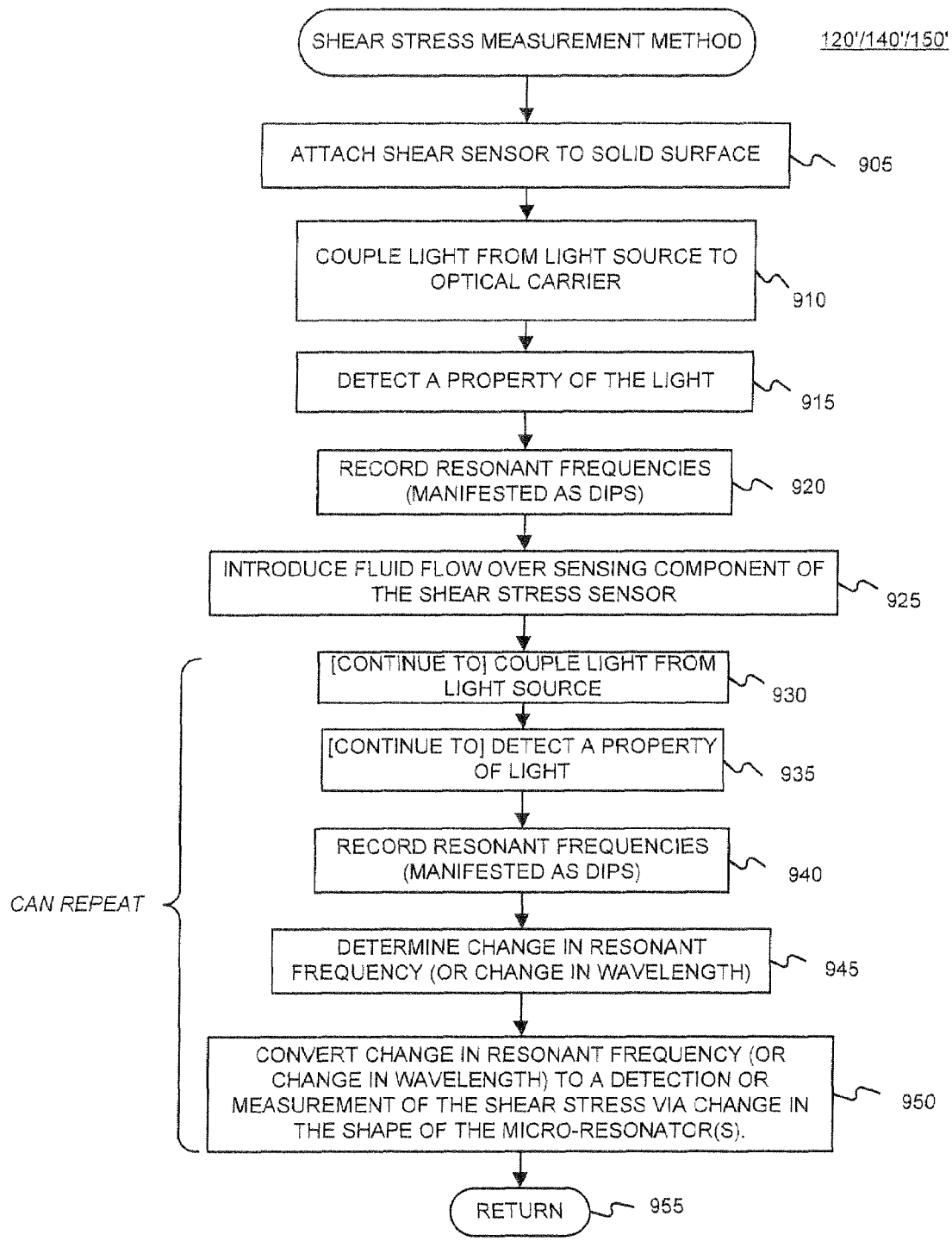
FIG. 9 is a flow diagram of an exemplary measurement method for measuring shear stress, in a manner consistent with the present invention, based on a shift of optical resonances of a micro-resonator.

FIG. 9 is a flow diagram of an exemplary method 120'/140'/150' that may be used to effect light sourcing operations 120, light detection operations 140, and shear stress measurement operations 150 used with a shear stress sensor consistent with the present invention. The order in which the acts are performed is not intended to be limited by the order shown in FIG. 9. As shown in block 905, the shear sensor is attached to a solid surface (e.g., wall or skin). As shown in block 910, light from a light source is coupled to the optical carrier. The light source may be a tunable laser, for example, and may couple light to a first end of an optical fiber of a shear stress sensor having an attached micro-resonator. As indicated by block 915, a property of the light is detected. The property of the light may be detected by a broadband, photodiode detector, for example, which may be coupled to a second end of an optical fiber of a shear stress sensor having an attached micro-resonator. The resonant frequencies, seen as dips (Recall, e.g., FIG. 5.), may be recorded, as indicated by block 920. Then, as indicated by block 925, the fluid flow is introduced over the sensing component of the shear stress sensor. As was the case with blocks 910 and 915, light from a light source is (or continues to be) coupled and a property of the light is detected as indicated by acts 930 and 935, respectively. As was the case with block 920, the resonant frequencies, seen as dips, may be recorded, as indicated by block 940. The change in resonant frequency (or the change in the associated wavelength) is determined, as indicated in block 945. This may be a matter of determining the differences between the dips before and after the fluid flow is introduced. Finally, as indicated by block 950, the determined change in resonant frequency (or determined change in the wavelength) is converted to a measurement of the deformation of the micro-resonator, from which the shear stress of the solid surface caused by the fluid flow can be calculated. Alternatively, the determined change in resonant frequency may be directly converted to a shear stress value (e.g., via a lookup table, a predefined formula, etc.). As indicated by the bracket adjacent to blocks 930 through 950, these acts may be repeated. The method may be left via RETURN node 955.

§4.5 Exemplary Methods for Coupling Micro-Resonators and Optical Fiber

In the following, the term "connection" will be used to generally refer to all (e.g., mechanical, optical, electromagnetic, etc.) interactions between a micro-resonator and a carrier, such as an optical fiber. The term "coupling" will refer to the evanescent connection of a micro-resonator and a fiber. By overlapping the evanescent field that surrounds a micro-resonator, and typically extends for a characteristic length of about 0.1 μm from the surface, with the evanescent field from the core of an optical fiber, (optical) coupling can be achieved. (See, e.g., the article, A. Serpenguzel, S. Arnold, G. Griffel, J. A. Lock, "Efficient Coupling of Guided Waves to Micro-resonator Resonances Using an Optical Fiber," *J. Opt. Soc. B*, 14, 790 (1997).) Some exemplary methods for coupling the fiber and micro-resonator(s) are described herein.

Generally, the micro-resonators may be connected to the eroded fiber with techniques used by biochemists for attaching micro-resonators to microscope slides (See, e.g., the article, F. J. Steemers, J. A. Ferguson, D. R. Walt, "Screening Unlabeled DNA targets with Randomly Ordered Fiber Optic Gene Arrays," *Natur. Biotech.* 18, 91 (2000).)(incorporated herein by reference), or by other silanization methods (See, e.g., The Colloid Chemistry of Silica, H. E. Bergna, ed. Adv. Chem. Ser. 234, Amer. Chem. Soc. (1994)(incorporated herein by reference); E. P. Plueddemann, Silane Coupling Agents Kluwer (1990) (incorporated herein by reference).).

In a first example, a siloxane network may be used to bridge a silica fiber and a silica micro-resonator. More specifically, a tiny amount (e.g., ~Pico liter) of tetramethozysilane or dimethyldimethoxysilane may be applied (e.g., dropped) into a space between a micro-resonator and the fiber, followed by dehydration and baking in an oven. (See, e.g., E. P. Plueddemann, Silane Coupling Agents Kluwer (1990)(incorporated herein by reference).) The resultant fiber-sphere pair is chemically identical to bare silica.

In a second example, amide and other bonds may be used to bridge a silica micro-resonator and a silica fiber. More specifically, surface silanols on the micro-resonator and fiber can be converted to primary amines. Consequently, the two amines will be bonded by acid anhydride or dialdehyde. Silica surface has a high density of reactive silanols (~0.05 Å-2), or can at least be modified to have silanols at high density by washing in hydrochloric acid and rinsing followed by heating. Amino silanation will be accomplished by reacting silanols with amino silanation agencies such as aminopropyl trimethoxysilane. The silanation methods have been widely used to make glass fiber compatible to a plastic matrix to prepare fiber-reinforced plastic. (See, e.g., the Pluedde- mann article.) Bridging two amines with acid anhydride such as succinic anhydride or dialdehyde such as glutaraldehyde is widely used in biochemistry. (See, e.g., J. McCafferty, H. R. Hoogenboom, D. J. Chiswell Ed., Antibody Engineering, IRL Press (1996)(incorporated herein by reference).)

Instead of amine modification, the silica surface can be modified with carboxylic acid (by aminopropyl modification followed by reaction with succinic anhydride) and bridge two acids with carbodiimide.

The two foregoing methods form similar functional groups on both the fiber and micro-resonator. Some believe that one of these functional groups can be modified with amine and the other of these functional groups can be modified with carboxyl, so that the contact points can convert to amide bonds.

Amide bond formation is advantageous in that (i) the bonds are formed only where the sphere and fiber are in contact, and (ii) the resultant micro-resonator-fiber complex retains reactive surface moieties for further biochemical and biological functionalization.

In a third example, a plastic fiber is connected with a plastic micro-resonator. PMMA spheres having a carboxylated surface are commercially available, in various diameters, from PolySciences Inc. of Warrington, Pa. However, the PMMA core of optical fiber does not have a carboxylated surface (not functionalized). Carboxylic acid may be attached to the optical fiber core by coating the eroded fiber with a copolymer of methyl methacrylate and acrylic acid in solution, followed by annealing. Thereafter, bridging the two carboxylic groups can be done in the same manner as described above for bridging silica.

A tiny amount of silanization agent and a bridging agent may be provided (e.g., dropped), for example with a Pico liter jet (See, e.g., the article S. Arnold, L. M. Folan, "A Fluorescence Spectrometer for a Single Electrodynamically Levitated Microparticle," Rev. Sci. Inst. 57, 2250 (1986)(incorporated herein by reference).) onto the micro-resonator-fiber core contact.

§4.6 Conclusions

It is clear from the foregoing that embodiments consistent with the present invention provide novel methods and apparatus capable of dynamically measuring stresses and strains on a solid surface subject to a fluid flow, based on a shift of optical resonances of a micro-resonator. In the disclosed sensors, the elastic deformation and refractive index change of a micro-resonator due to mechanical stress is exploited. With this approach, mechanical deformations in the order of a nanometer can be detected and related to shear stress. Hence, the present invention offers advantages over the currently available methods in measurement sensitivity and reliability, as well as sensor ruggedness. Due to the optical attributes, the sensors can be built with much smaller sensing element sizes than what is possible with the currently available methods. Thus, the compact and robust wall shear stress micro-sensors can be incorporated into optical sensor arrays for distributed wall shear stress measurements.

What is claimed is:

1. A shear stress sensor comprising:
   a) a base component;
   b) a sensing component including a sensing surface;
   c) a micro-resonator arranged between the base component and the sensing component; and
   d) an optical carrier optically coupled with the micro-resonator,
      wherein the sensing component can move with respect to the base component responsive to a fluid flow across the sensing surface, such that the micro-resonator undergoes a change in shape and refractive index.

2. The shear stress sensor of claim 1 wherein the base component defines a cavity, and wherein the sensing component is accommodated by the cavity of the base component.

3. The shear stress sensor of claim 2 wherein the micro-resonator is arranged within the cavity of the base component.

4. The shear stress sensor of claim 3 wherein at least two micro-resonators are arranged within the cavity of the base component, such that when the sensing component moves with respect to the base component responsive to a fluid flow, one micro-resonator is compressed while the other micro-resonator is expanded.

5. The shear stress sensor of claim 3 further comprising:
   e) a preload component arranged between the base component and the sensing component,
      wherein the preload component forcibly moves the sensing component, such that a predetermined force is applied to the micro-resonator which undergoes a change in shape and refractive index.

6. The shear stress sensor of claim 3 wherein a gap between the base component and the sensing component is on the order of 1 μm.

7. The shear stress sensor of claim 3, wherein a gap between the base component and the sensing component is on the order of at least 100 μm, further comprising:
   e) a flexible gap-cover component arranged between the base component and the sensing component, wherein the fluid flow across the sensing surface of the sensing component also flows across the compressible gap-cover component.

8. The shear stress sensor of claim 7 wherein the flexible gap-cover component is formed of rubber.

9. The shear stress sensor of claim 1 wherein the sensing surface of the sensing component is formed of a material having a modulus of elasticity of at least 50 GPa.

10. The shear stress sensor of claim 7 wherein the sensing surface of the sensing component is formed of titanium.

11. The shear stress sensor of claim 1 wherein at least one of the base component and sensing component includes a detent and wherein the micro-resonator is arranged to engage the detent.

12. The shear stress sensor of claim 1 wherein the micro-resonator is formed of one of a group consisting of (A) silica, (B) polymethyl methacrylate, and (C) Poly(n-hexl methacrylate).

13. The shear stress sensor of claim 1 wherein the micro-resonator has a radius of in the range of 50 μm-1000 μm.

14. The shear stress sensor of claim 1 wherein the micro-resonator is selected from a group consisting of (A) a micro-sphere, (B) a micro-bead, (C) a micro-disk, and (D) a shape having elliptical cross-section.

15. A method for determining a shear stress, the method comprising:
   a) providing, in a fluid flow, a shear stress sensor including
      1) a base component;
      2) a sensing component including a sensing surface;
      3) a micro-resonator arranged between the base component and the sensing component; and
      4) an optical carrier optically coupled with the micro-resonator,
      wherein the sensing component can move with respect to the base component responsive to the fluid flow across the sensing surface, such that the micro-resonator undergoes a change in shape and refractive index;
   b) coupling light from a light source into a first end of the optical carrier of the shear stress sensor;
   c) detecting a property of the light using a detector coupled to a second end of the optical carrier of the shear stress sensor; and
   d) determining the shear stress based on the detected property of the light, wherein said property is based on a shift in resonance of the micro-resonator caused by the change in shape and refractive index of the micro-resonator.

16. The method of claim 15 wherein an optical quality factor of the resonance of the micro-resonator is at least $10^4$.

17. The method of claim 15 wherein the act of detecting a property of the light includes determining dips in the transmission spectrum of the light as a resonance mode of the micro-resonator.

18. The method of claim 15 wherein a change in size of the micro-resonator radius of $10^{-9}$ m can be detected.

19. The method of claim 15 wherein estimated force resolutions of $10^{-7}$ Newtons can be detected.

20. A system for measuring shear stress comprising:
   a) a shear stress sensor including
      1) a base component;
      2) a sensing component including a sensing surface;
      3) a micro-resonator arranged between the base component and the sensing component; and
      4) an optical carrier optically coupled with the micro-resonator,
      wherein the sensing component can move with respect to the base component responsive to a fluid flow across the sensing surface, such that the micro-resonator undergoes a change in shape and refractive index;
   b) a light source coupled to a first end of the optical carrier for supplying light to the optical carrier of the shear stress sensor;
   c) a detector coupled to a second end of the optical carrier for detecting a property of the light of the shear stress sensor; and
   d) means for determining a shear stress of the fluid flow based on the detected property of the light, wherein said property is based on a shift in resonance of the micro-resonator caused by the change in shape and refractive index of the micro-resonator.

21. The system of claim 20 wherein the light source and the detector are controlled by a general purpose processor executing stored program instructions.

22. The system of claim 20 wherein the light source and the detector are controlled by a computer comprising:
   a) one or more processors,
   b) one or more storage devices,
   c) one or more input interfaces,
   d) one or more output interfaces, and
   e) a communications means.

23. The system of claim 22 wherein data representative of detected light may be stored by said computer.

24. The system of claim 20 wherein the means for determining a shear stress is performed by a general purpose processor executing stored program instructions.

25. The system of claim 20 wherein the means for determining a shear stress is performed by a computer comprising:
   a) one or more processors,
   b) one or more storage devices,
   c) one or more input interfaces,
   d) one or more output interfaces, and
   e) a communications means.

* * * * *